(12) United States Patent
Greenberger (10) Patent No.: US 10,097,657 B2
(45) Date of Patent: Oct. 9, 2018

(54) PROVIDING PUSH NOTIFICATIONS TO A DEVICE BASED ON NEARBY DEVICES

(71) Applicant: International Business Machines Corporation, Armonk, NY (US)

(72) Inventor: Jeremy A. Greenberger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 53 days.

(21) Appl. No.: 15/132,830

(22) Filed: Apr. 19, 2016

(65) Prior Publication Data
US 2017/0302750 A1   Oct. 19, 2017

(51) Int. Cl.
| H04L 29/08 | (2006.01) |
| H04W 8/00 | (2009.01) |
| H04W 4/02 | (2018.01) |
| G06Q 30/02 | (2012.01) |
| H04W 4/021 | (2018.01) |
| H04W 4/06 | (2009.01) |

(52) U.S. Cl.
CPC ............ *H04L 67/26* (2013.01); *H04W 4/023* (2013.01); *H04W 8/005* (2013.01); *G06Q 30/0261* (2013.01); *G06Q 30/0267* (2013.01); *H04W 4/021* (2013.01); *H04W 4/06* (2013.01)

(58) Field of Classification Search
CPC ....... H04L 67/26; H04L 67/306; H04L 67/22; H04L 65/403; H04L 51/32; G06F 1/3215; G06K 2209/27; H04W 4/02; H04W 8/005; H04W 4/023; H04W 4/021; H04W 4/06; G06Q 30/0261; G06Q 30/0267

USPC .......... 709/204–206, 224; 455/456.3, 456.1; 707/724; 705/14.58
See application file for complete search history.

(56) References Cited

U.S. PATENT DOCUMENTS

| 8,244,822 | B1 | 8/2012 | Lowry et al. |
| 8,787,939 | B2 | 7/2014 | Papakipos et al. |
| 9,020,110 | B1 | 4/2015 | Baharav et al. |
| 9,118,724 | B1 | 8/2015 | Sooriyan et al. |

(Continued)

OTHER PUBLICATIONS

"Appendix P: List of IBM Patents or Patent Applications Treated as Related", dated Jul. 26, 2017, pp. 1-2.

(Continued)

*Primary Examiner* — Jungwon Chang
(74) *Attorney, Agent, or Firm* — Christopher K. McLane; Alexander G. Jochym (57) ABSTRACT

In an approach to providing push notifications to a computing device, one or more computer processors detect a first computing device. The one or more computer processors determine whether one or more additional computing devices are detected within a pre-defined proximity threshold of the first computing device. In response to determining one or more additional computing devices are detected within a pre-defined proximity threshold of the first computing device, the one or more computer processors retrieve data from the one or more additional computing devices. The one or more computer processors determine, based, at least in part, on the retrieved data from the one or more additional computing devices, a notification. The one or more computer processors send the notification to the first computing device.

17 Claims, 5 Drawing Sheets

(56) References Cited

U.S. PATENT DOCUMENTS

| | | | |
|---|---|---|---|
| 9,202,245 B2 | 12/2015 | Kostka et al. | |
| 2011/0028129 A1 | 2/2011 | Hutchison et al. | |
| 2012/0278385 A1 | 11/2012 | Papakipos et al. | |
| 2013/0072225 A1* | 3/2013 | Gaver | H04W 24/00 455/456.1 |
| 2013/0267253 A1* | 10/2013 | Case | H04W 4/021 455/456.3 |
| 2014/0279014 A1* | 9/2014 | Roka | G06Q 30/0261 705/14.58 |
| 2015/0262430 A1 | 9/2015 | Farrelly et al. | |
| 2015/0302030 A1* | 10/2015 | Vaccari | G06F 1/3215 707/724 |
| 2017/0041759 A1* | 2/2017 | Gantert | H04W 4/028 |
| 2017/0116195 A1* | 4/2017 | Ratiu | H04L 51/32 |
| 2017/0134516 A1* | 5/2017 | Gutman | H04L 67/26 |
| 2017/0228804 A1* | 8/2017 | Soni | G06Q 30/0601 |

OTHER PUBLICATIONS

U.S. Appl. No. 15/659,987, filed Jul. 26, 2017; Entitled "Providing Push Notifications to a Device Based on Nearby Devices".

"Apple Push Notification Service", Copyright 2015 Apple Inc., Updated Dec. 17, 2015, 9 pages, <https://developer.apple.com/library/ios/documentation/NetworkingInternet/Conceptual/RemoteNotificationsPG/Chapters/ApplePushService.html>.

"Bluetooth", Android Developers, Printed on Mar. 2, 2016, 26 pages, <http://developer.android.com/guide/topics/connectivity/bluetooth.html>.

"IBM Introduces 'IBM ExperienceOne' to Help Organizations Bring Together Marketing, Sales and Services Practices to Deepen Customer Engagement", IBM News room, 4 pages, May 13, 2014, <https://www-03.ibm.com/press/us/en/pressrelease/43886.wss>.

"IBM Mobile Push Notification", Formerly Xtify Mobile Push Notification, IBM, 3 pages, downloaded on Mar. 2, 2016, <http://www-03.ibm.com/software/products/en/mobile-push-notification>.

"IBM Presence Insights" (Documentation), IBM, 2 pages, downloaded on Mar. 2, 2016, <https://presenceinsights.ng.bluemix.net/pidocs/>.

"IBM Presence Insights", IBM, 4 pages, downloaded on Mar. 2, 2016, <http://www-03.ibm.com/software/products/en/ibm-presence-insights>.

"The Value of Push Notifications", Apps a Plenty, Printed on Mar. 2, 2016, 12 pages, <http://appaplenty.com/the-value-of-push-notifications/>.

Mell et al., "The NIST Definition of Cloud Computing: Recommendations of the National Institute of Standards and Technology", Special Publication 800-145, Computer Security Division Information Technology Laboratory National Institute of Standards and Technology, U.S. Department of Commerce, National Institute of Standards and Technology, Sep. 2011, 7 pages.

* cited by examiner

PROVIDING PUSH NOTIFICATIONS TO A DEVICE BASED ON NEARBY DEVICES

BACKGROUND OF THE INVENTION

The present invention relates generally to the field of push notifications, and more particularly to providing push notifications to a device based on nearby devices.

Push technology, also known as server push, is a type of Internet-based communication where the request for a given transaction is initiated by a "publisher" or server. Push technology is contrasted with pull technology where the request for transmission of information is initiated by a receiving device or "client." Push services are sometimes based on information preferences expressed in advance. This is referred to as a "publish/subscribe" model. For example, a client might subscribe to one or more information "channels." The server associated with the channels can then push information to the client when new content becomes available. There are many types of push services. For example, synchronous conferencing and instant messaging are forms of push services. Increasingly popular are push-enabled web applications including market data distribution (e.g., stock tickers), online chat/messaging systems (e.g., "webchat"), auctions, sports results, and marketing promotions.

Proximity marketing is the offering of specially selected information, products, or services to customers, based on their current location—often in a retail environment, arena, public building or space. Offers are most often made on a mobile device, when the user has 'opted in' for offers. The customer's location may be determined with indoor and outdoor sensors. That location is shared with an integrated database, which sends an offer—a form of "push notification"—based on that customer's profile. Timing may also be important in proximity marketing. For example, information or incentives at a conference or concert might only be relevant and distributed at a specific moment during the event. This targeting precision has tremendous potential for marketers.

SUMMARY

Embodiments of the present invention disclose a method, a computer program product, and a system for providing push notifications to a computing device. The method may include one or more computer processors detecting a first computing device. The one or more computer processors determine whether one or more additional computing devices are detected within a pre-defined proximity threshold of the first computing device. In response to determining one or more additional computing devices are detected within a pre-defined proximity threshold of the first computing device, the one or more computer processors retrieve data from the one or more additional computing devices. The one or more computer processors determine, based, at least in part, on the retrieved data from the one or more additional computing devices, a notification. The one or more computer processors send the notification to the first computing device.

DETAILED DESCRIPTION

Push notifications are a popular means of providing enhanced experiences for customers of venues, such as stadiums, airports, retail stores, and hospitals. Many services use mobile device notifications for promotional purposes. These notifications may be triggered by some type of action which may be time-based, location-based, or event-based. Generally, the notifications are independent and unaware of other devices that are nearby. Embodiments of the present invention recognize that marketing improvement may be gained by enhancing a push notification service with awareness of nearby devices to customize the notification to a target device. Implementation of embodiments of the invention may take a variety of forms, and exemplary implementation details are discussed subsequently with reference to the Figures.

Figure 1:
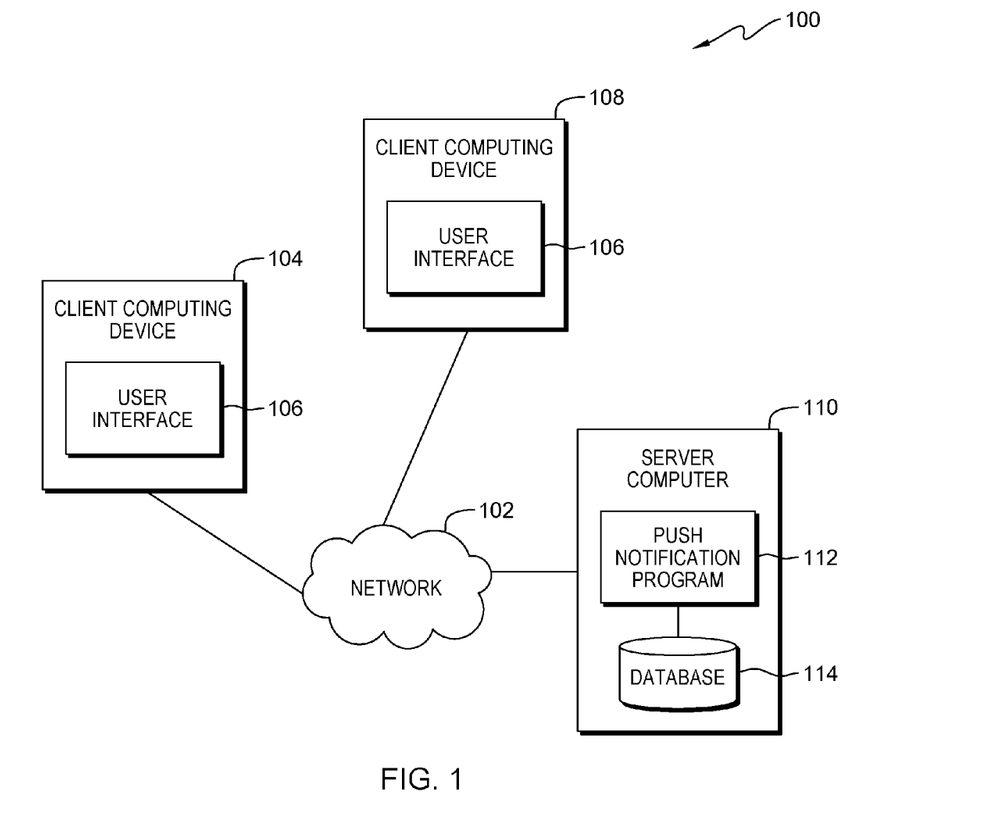
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104, client computing device 108, and server computer 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, client computing device 108, server computer 110, and other computing devices (not shown) within distributed data processing environment 100.

Client computing device 104 and client computing device 108 can each be one or more of a laptop computer, a tablet computer, a smart phone, or any programmable electronic device capable of communicating with various components and devices within distributed data processing environment 100, via network 102. In general, client computing devices 104 and 108 each represent any programmable electronic device or combination of programmable electronic devices capable of executing machine readable program instructions and communicating with other computing devices (not shown) within distributed data processing environment 100 via a network, such as network 102. Client computing devices 104 and 108 each include an instance of user interface 106.

User interface 106 provides an interface for a user of client computing device 104 or a user of client computing device 108 with server computer 110. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 or a user of client computing device 108 and server computer 110. Mobile application software, or an "app," is a computer program designed to run on smart phones, tablet computers and other mobile devices. User interface 106 enables client computing device 104 or client computing device 108 to receive push notifications from server computer 110. In one embodiment, user interface 106 is a venue-specific app, downloaded to client computing device 104, or client computing device 108, by a user, which enables communication between client computing device 104, or client computing device 108, and push notification program 112. In the embodiment, a user can set up preferences, via the app, associated with push notifications, and whether to allow push notification program 112 to detect the device location.

Server computer 110 can be a standalone computing device, a management server, a web server, a mobile computing device, or any other electronic device or computing system capable of receiving, sending, and processing data. In other embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any programmable electronic device capable of communicating with client computing device 104, client computing device 108, and other computing devices (not shown) within distributed data processing environment 100 via network 102. In another embodiment, server computer 110 represents a computing system utilizing clustered computers and components (e.g., database server computers, application server computers, etc.) that act as a single pool of seamless resources when accessed within distributed data processing environment 100. Server computer 110 includes push notification program 112 and database 114. Server computer 110 may include internal and external hardware components, as depicted and described in further detail with respect to FIG. 3.

Push notification program 112 leverages the presence of nearby devices to determine customized notifications of a target client computing device. Push notification program 112 detects the presence of a target device, such as client computing device 104, in a geographic zone where notifications of products, services, or events may be of interest to the user of the target device. Push notification program 112 then monitors for nearby devices, such as client computing device 108, and determines whether one or more nearby devices are within a pre-defined proximity threshold. A proximity threshold, as used herein, refers to a threshold value that indicates a proximity to a location. For example, a proximity threshold may be a pre-defined radius with respect to a given location or target device. If push notification program 112 finds one or more devices within the threshold, then push notification program 112 retrieves data from the nearby devices that may be useful in customizing a notification for the target device. Based on the retrieved data, push notification program 112 determines a notification and sends the notification to the target device. In the depicted embodiment, push notification program 112 is a standalone program. In another embodiment, push notification program 112 may be integrated into one or more of a plurality of existing cloud-based services for notifications and alerts, as would be recognized by one skilled in the art. Push notification program 112 is depicted and described in further detail with respect to FIG. 2.

Database 114 is a repository for data used by push notification program 112. In the depicted embodiment, database 114 resides on server computer 110. In another embodiment, database 114 may reside elsewhere within distributed data processing environment 100 provided push notification program 112 has access to database 114. A database is an organized collection of data. Database 114 can be implemented with any type of storage device capable of storing data and configuration files that can be accessed and utilized by server computer 110, such as a database server, a hard disk drive, or a flash memory. Database 114 stores metadata associated with users of user interface 106 such as a history of use of user interface 106 with a client computing device, such as client computing devices 104 or 108.

Figure 2:
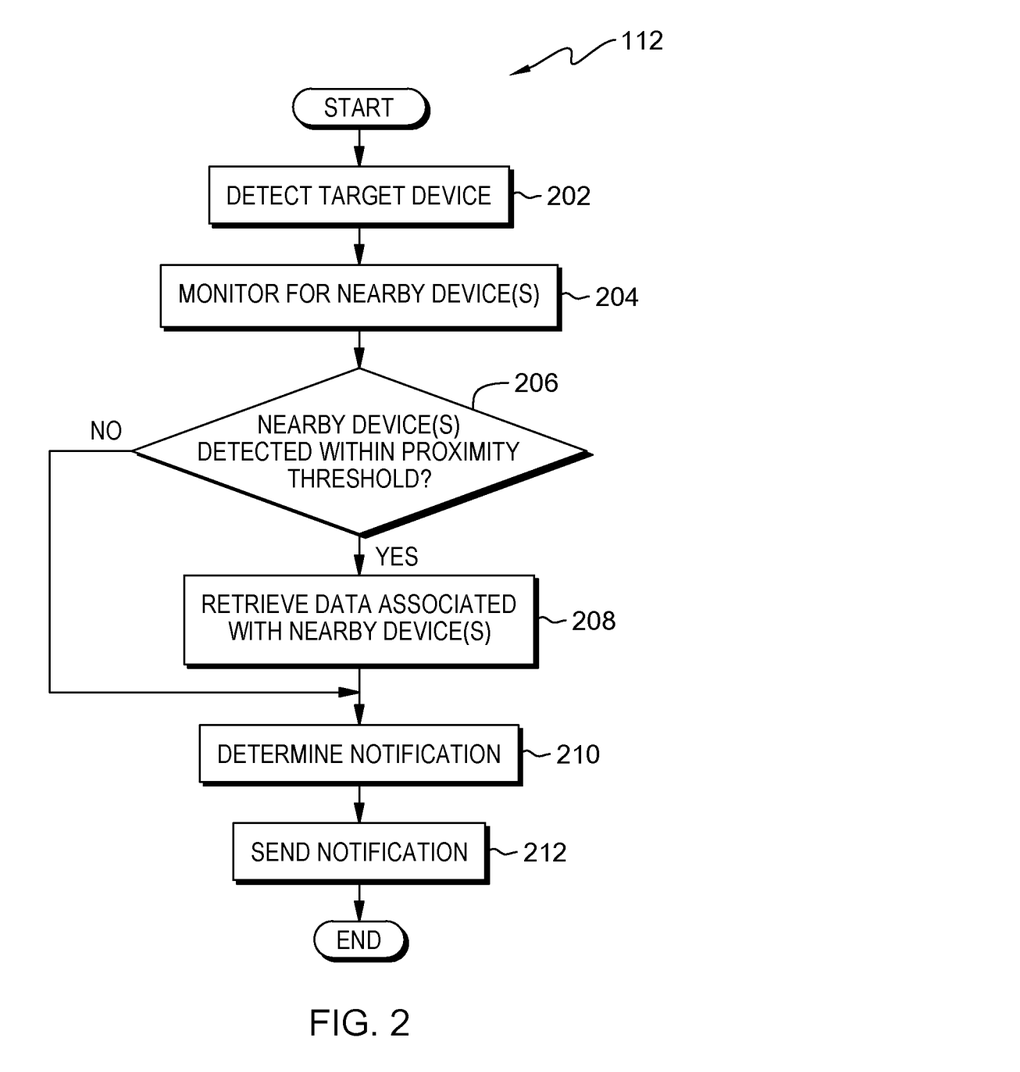
FIG. 2 is a flowchart depicting operational steps of a push notification program, on a server computer within the distributed data processing environment of FIG. 1, for push notifications based on nearby devices, in accordance with an embodiment of the present invention.

FIG. 2 is a flowchart depicting operational steps of push notification program 112, on server computer 110 within distributed data processing environment 100 of FIG. 1, for push notifications based on nearby devices, in accordance with an embodiment of the present invention.

Push notification program 112 detects a target device (step 202). Push notification program 112 uses one or more of a plurality of techniques known in the art to detect the presence of a target device as the device, such as client computing device 104, enters a pre-defined location or zone. For example, push notification program 112 may use a global positioning system (GPS), Wi-Fi®, Bluetooth®, RFID, etc. In one embodiment, the zone is location-based. For example, a zone may be defined as a location within a radius of a specific distance of one or more transceiver devices that transmit a beacon signal in a venue. In another example, a zone may be defined by GPS coordinates. In another embodiment, the zone may also include a time requirement, where push notification program 112 detects the location of a target device within a pre-defined period of time. For example, the device enters a particular location of a venue during a specific time period, such as between 3:00 pm and 4:00 pm. In a further embodiment, push notification program 112 may require that the target device reside in the pre-defined location for a specified period of time. For example, the target device enters a particular location of a retail store and stays in the location for at least 30 seconds. In one embodiment, upon detection of the target device, push notification program 112 determines whether the target device includes user interface 106.

Push notification program 112 monitors for nearby device(s) (step 204). Push notification program 112 uses one or more of a plurality of techniques known in the art, as discussed earlier, to monitor the pre-defined zone for the presence of any other devices, such as client computing device 108, within a proximity threshold to the target device. In one embodiment, push notification program 112 monitors for nearby devices by receiving a signal from the target device in response to the target device detecting a location signal from one or more transceiver devices, such as a Bluetooth® beacon, in the pre-defined zone. Push notification program 112 instructs the target device to capture the location of nearby devices, i.e., devices within a pre-defined proximity threshold. Then push notification program 112 retrieves location information of nearby devices from the target device. In an embodiment where micro-location sensing technologies, such as a Wi-Fi® based triangulation system, are present, push notification program 112 may monitor for nearby devices by receiving location information regarding the nearby devices from the micro-location sensors. In a further embodiment where a Wi-Fi® based triangulation system is present but nearby devices have not enabled Wi-Fi®, push notification program 112 may monitor for nearby devices by sending a pre-notification to the target device to instruct the target device, via user interface 106, to capture the location of nearby devices. In one embodiment, the proximity threshold is defined as a radius of a specific distance around the target device. In another embodiment, the proximity threshold may be a location within the same pre-defined location or zone as the target device. In a further embodiment, where the proximity threshold is radius around the target device of a specific distance, push notification program 112 monitors for nearby devices by locating a device whose proximity threshold overlaps the proximity threshold of the target device. In one embodiment, push notification program 112 determines whether the nearby devices include user interface 106.

Push notification program 112 determines whether any nearby devices are detected within a pre-defined proximity threshold (decision block 206). Based on received location information for nearby devices, push notification program 112 determines whether one or more devices are within the proximity threshold of the target device. If push notification program 112 determines one or more nearby devices are detected within a pre-defined proximity threshold ("yes" branch, decision block 206), then push notification program 112 retrieves data associated with the nearby devices (step 208). Push notification program 112 can customize a notification to the target device based on data associated with nearby devices. Data associated with nearby devices may include, but is not limited to, what devices are nearby, a number of devices nearby, whether the nearby devices have a history with push notification program 112, whether push notification program 112 detected the target device in proximity to the nearby devices in the past, or metadata associated with the nearby devices. Metadata may include, for example, the device identity or the device type. Push notification program 112 may use the retrieved metadata to identify a user's personal preferences. For example, the metadata may include any publicly available personal information about the device user, including frequent contacts, social media connections, or a history of use of user interface 106 or of other applications downloaded on the device.

Responsive to retrieving data associated with nearby devices, or if push notification program 112 determines one or more nearby devices are not detected within a pre-defined proximity threshold ("no" branch, decision block 206), then push notification program 112 determines a notification (step 210). Push notification program 112 determines a notification for the target device based on whether or not nearby devices are within the proximity threshold. For example, if the user of client computing device 104 walks into a picture frame department of a store, and push notification program 112 does not detect any devices within the proximity threshold, then push notification program 112 may determine a notification such as "Here is a coupon for 50% off picture frames." If, for example, the user of client computing device 104 walks into a picture frame department of a store, and push notification program 112 detects a device belonging to a friend of the user of client computing device 104, i.e., the user of client computing device 108, within the proximity threshold, then push notification program 112 may determine from the retrieved data that the user of client computing device 108 has previously used a coupon for picture frames, and then determine a notification such as "Here is a coupon for 50% off picture frames. Your friend has taken advantage of this coupon in the past. Ask your friend if it was worth it."

In another example, the user of client computing device 104 walks into a fitness accessory area of a store wearing a personal fitness monitor. In the example, client computing device 104 is the user's smart phone while client computing device 108 is the user's personal fitness monitor. Since push notification program 112 detects the personal fitness monitor within the proximity threshold, push notification program 112 determines a notification such as "We have a full selection of fitness monitor accessories in aisle 4A." In an example where push notification program 112 does not detect a fitness monitor as a nearby device, push notification program 112 may determine a notification such as "Save 25% on personal fitness monitors." In one embodiment, push notification program 112 may determine that no criteria are met for a notification and therefore push notification program 112 does not determine a notification. In an embodiment where push notification program 112 is not integrated into an existing cloud-based service for notifications and alerts, push notification program 112 sends the retrieved data to the cloud-based service, and the cloud-based service determines the notification.

Push notification program 112 sends a notification (step 212). In response to determining a notification, push notification program 112 sends the notification to the user of client computing device 104, via user interface 106. In one embodiment, push notification program 112 may also send a notification to one or more nearby devices. In an embodiment where push notification program 112 is not integrated into an existing cloud-based service for notifications and alerts, the cloud-based service sends the notification.

Figure 3:
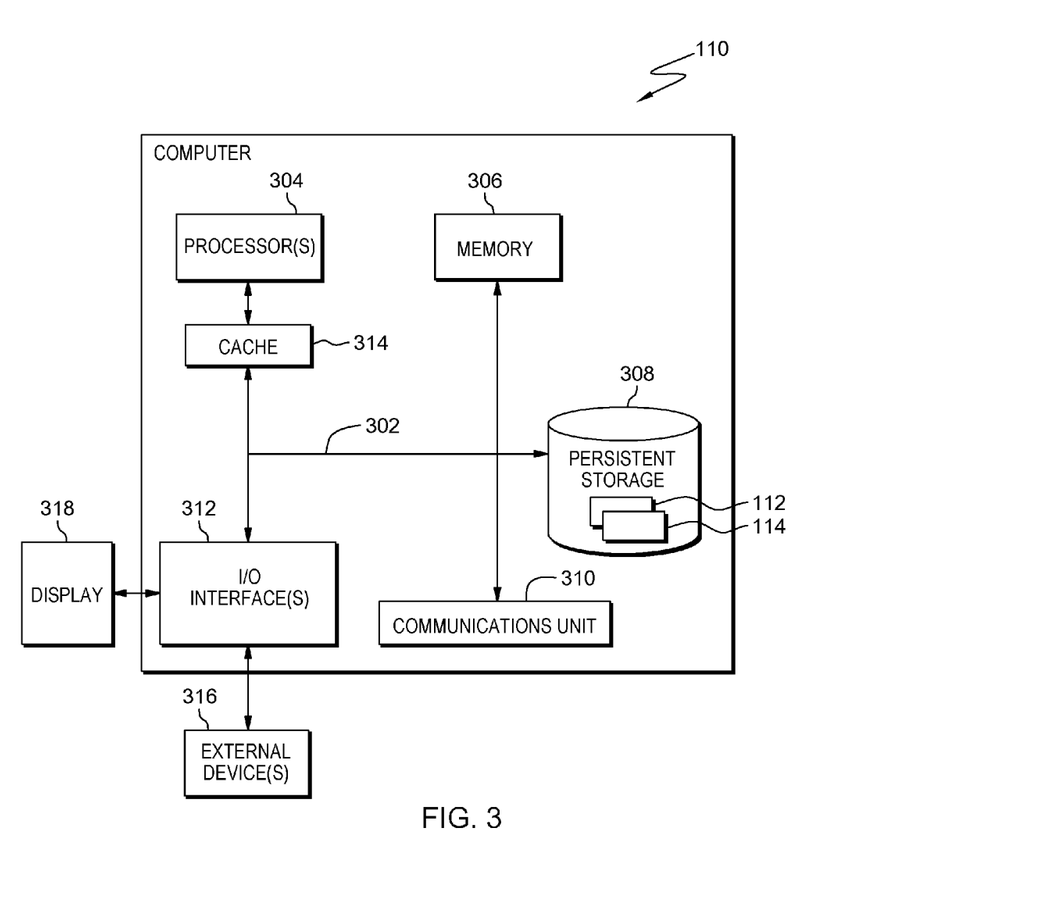
FIG. 3 depicts a block diagram of components of the server computer executing the push notification program within the distributed data processing environment of FIG. 1, in accordance with an embodiment of the present invention.

FIG. 3 depicts a block diagram of components of server computer 110 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 110 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., push notification program 112 and database 114 are stored in persistent storage 308 for execution and/or access by one or more of the respective processor(s) 304 of server computer 110 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing devices 104 and 108. In these examples, communications unit 310 includes one or more network interface cards. Communications unit 310 may provide communications through the use of either or both physical and wireless communications links. Push notification program 112 and database 114 may be downloaded to persistent storage 308 of server computer 110 through communications unit 310.

I/O interface(s) 312 allows for input and output of data with other devices that may be connected to server computer 110. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., push notification program 112 and database 114 on server computer 110, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
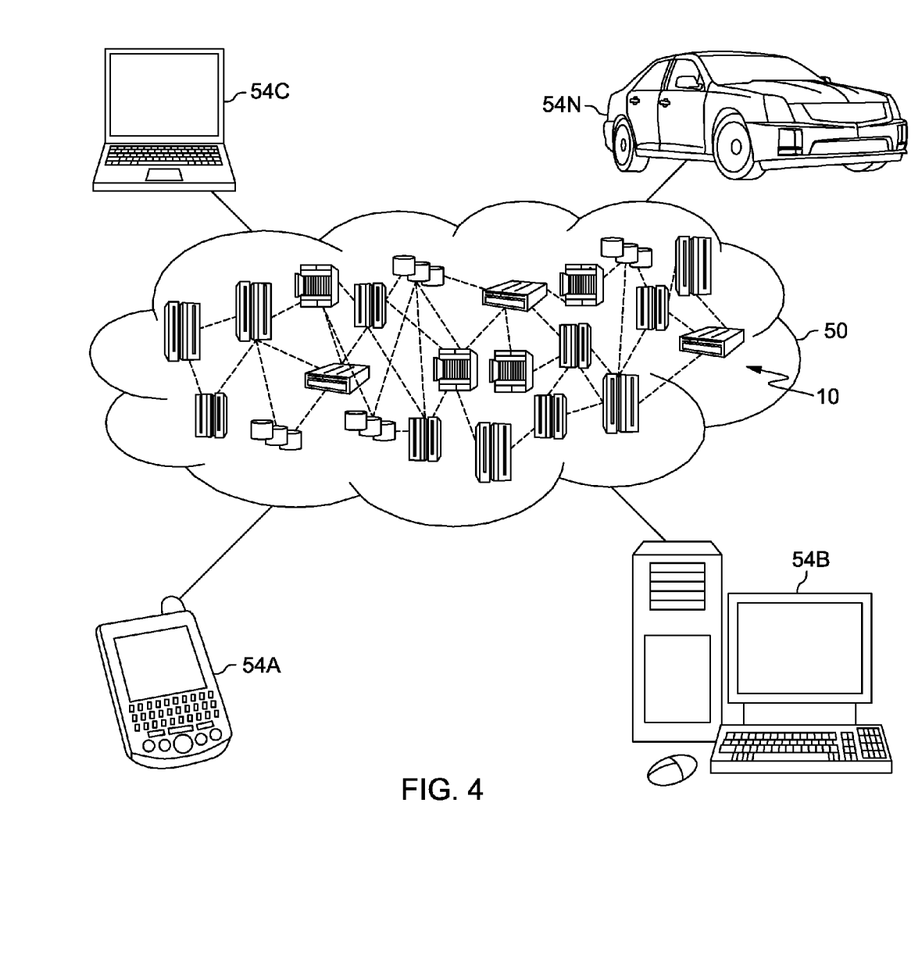
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 5:
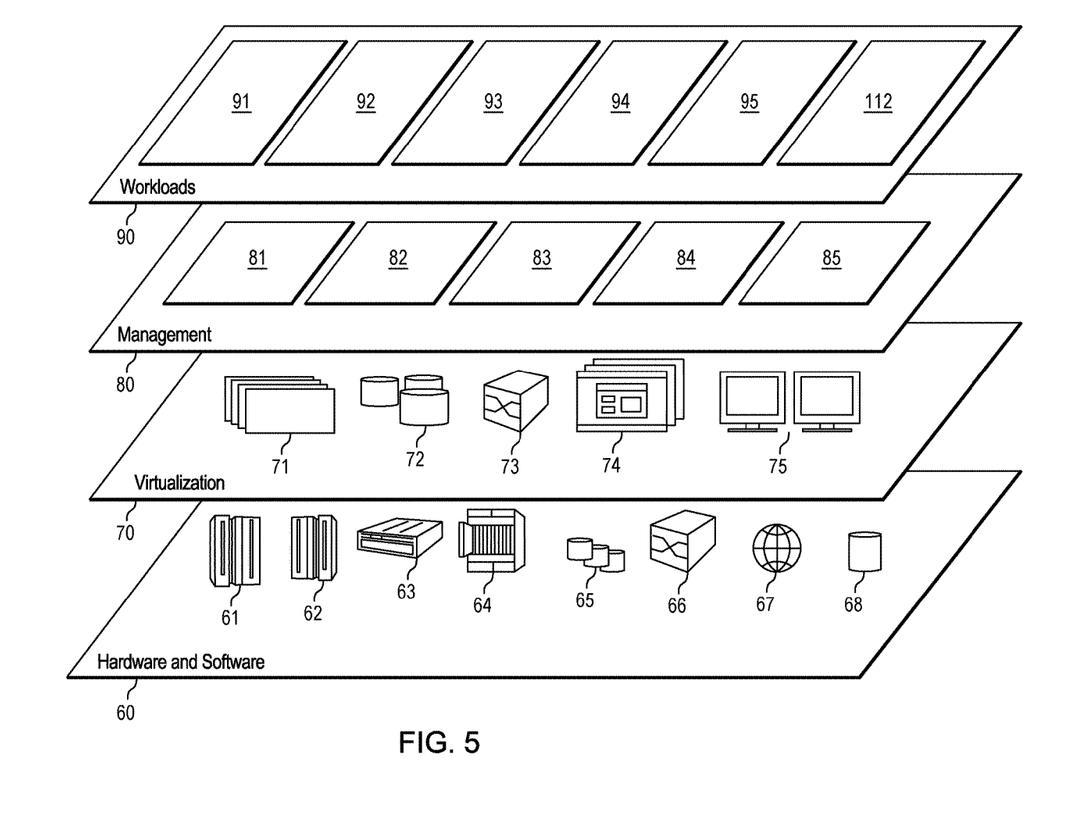
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and push notification program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing push notifications to a first smart phone, the method comprising:

detecting, by one or more computer processors, a first smart phone:

determining, by the one or more computer processors, whether one or more additional smart phones are detected within a pre-defined proximity threshold of the first smart phone;

responsive to determining one or more additional smart phones are detected within a pre-defined proximity threshold of the first smart phone, retrieving, by the one or more computer processors, data from the one or more additional smart phones;

creating, by the one or more computer processors, a notification, wherein the notification includes a coupon based, at least in part, on the retrieved data from the one or more additional smart phones, and wherein the retrieved data includes a number of additional smart phones within the proximity threshold, a history associated with the one or more additional smart phones, and metadata associated with the one or more additional smart phones; and sending, by the one or more computer processors, the notification to the first smart phone.

2. The method of claim 1, wherein metadata associated with the one or more additional smart phones includes at least: a device identity, a device type, publicly available personal information about a user of the one or more additional smart phones, one or more frequent contacts of a user of the one or more additional smart phones, one or more social media connections a user of the one or more additional smart phones, or a history of use of one or more computing applications downloaded on the one or more additional smart phones.

3. The method of claim 1, wherein determining whether one or more additional computing devices smart phones are within a pre-defined proximity threshold of the first smart phone further comprises receiving, by the one or more computer processors, a signal from the first smart phone that indicates a location of one or more of the one or more additional smart phones.

4. The method of claim 1, wherein determining whether one or more additional smart phones are within a pre-defined proximity threshold of the first smart phone further comprises detecting, by the one or more computer processors, a presence of the one or more additional smart phones within a pre-defined zone.

5. The method of claim 1, wherein the pre-defined proximity threshold includes at least a radius of a specific distance around the first smart phone or a location within a same pre-defined location as the first smart phone.

6. The method of claim 1, wherein the pre-defined proximity threshold includes a time requirement.

7. A computer program product for providing push notifications to a first smart phone, the computer program product comprising:
one or more computer readable storage devices and program instructions stored on the one or more computer readable storage devices, the stored program instructions comprising:
program instructions to detect a first smart phone;
program instructions to determine whether one or more additional smart phones are detected within a pre-defined proximity threshold of the first smart phone;
responsive to determining one or more additional smart phones are detected within a pre-defined proximity threshold of the first smart phone, program instructions to retrieve data from the one or more additional smart phones;
program instructions to create a notification, wherein the notification includes a coupon based, at least in part, on the retrieved data from the one or more additional smart phones, and
wherein the retrieved data includes a number of additional smart phones within the proximity threshold, a history associated with the one or more additional smart phones, and metadata associated with the one or more additional smart phones; and
program instructions to send the notification to the first smart phone.

8. The computer program product of claim 7, wherein metadata associated with the one or more additional smart phones includes at least: a device identity, a device type, publicly available personal information about a user of the one or more additional smart phones, one or more frequent contacts of a user of the one or more additional smart phones, one or more social media connections a user of the one or more additional smart phones, or a history of use of one or more computing applications downloaded on the one or more additional smart phones.

9. The computer program product of claim 7, wherein the program instructions to determine whether one or more additional smart phones are within a pre-defined proximity threshold of the first smart phone comprise program instructions to receive a signal from the first smart phone that indicates a location of one or more of the one or more additional smart phones.

10. The computer program product of claim 7, wherein the program instructions to determine whether one or more additional smart phones are within a pre-defined proximity threshold of the first smart phone comprise program instructions to detect a presence of the one or more additional smart phones within a pre-defined zone.

11. The computer program product of claim 7, wherein the pre-defined proximity threshold includes at least a radius of a specific distance around the first smart phone or a location within a same pre-defined location as the first smart phone.

12. The computer program product of claim 7, wherein the pre-defined proximity threshold includes a time requirement.

13. A computer system for providing push notifications to a first smart phone, the computer system comprising:
one or more computer processors;
one or more computer readable storage device;
program instructions stored on the one or more computer readable storage devices for execution by at least one of the one or more computer processors, the stored program instructions comprising:
program instructions to detect a first smart phone;
program instructions to determine whether one or more additional smart phones are detected within a pre-defined proximity threshold of the first smart phone;
responsive to determining one or more additional smart phones are detected within a pre-defined proximity threshold of the first smart phone, program instructions to retrieve data from the one or more additional smart phones;
program instructions to create a notification, wherein the notification includes a coupon based, at least in part, on the retrieved data from the one or more additional smart phones, and
wherein the retrieved data includes a number of additional smart phones within the proximity threshold, a history associated with the one or more additional smart phones, and metadata associated with the one or more additional smart phones; and
program instructions to send the notification to the first smart phone.

14. The computer system of claim 13, wherein metadata associated with the one or more additional smart phones includes at least: a device identity, a device type, publicly available personal information about a user of the one or more additional smart phones, one or more frequent contacts of a user of the one or more additional smart phones, one or more social media connections a user of the one or more additional smart phones, or a history of use of one or more computing applications downloaded on the one or more additional smart phones.

15. The computer system of claim 13, wherein the program instructions to determine whether one or more additional smart phones are within a pre-defined proximity threshold of the first smart phone comprise program instructions to receive a signal from the first smart phone that indicates a location of one or more of the one or more additional smart phones.

16. The computer system of claim 13, wherein the program instructions to determine whether one or more additional smart phones are within a pre-defined proximity threshold of the first smart phone comprise program instructions to detect a presence of the one or more additional smart phones within a pre-defined zone.

17. The computer system of claim 13, wherein the pre-defined proximity threshold includes at least a radius of a specific distance around the first smart phone or a location within a same pre-defined location as the first smart phone.

* * * * *